US009080678B2

(12) United States Patent
Naumann

(10) Patent No.: US 9,080,678 B2
(45) Date of Patent: Jul. 14, 2015

(54) GAS VALVE UNIT

(75) Inventor: Jörn Naumann, Durbach (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 252 days.

(21) Appl. No.: 13/876,193

(22) PCT Filed: Oct. 5, 2011

(86) PCT No.: PCT/EP2011/067375
§ 371 (c)(1),
(2), (4) Date: Mar. 27, 2013

(87) PCT Pub. No.: WO2012/049049
PCT Pub. Date: Apr. 19, 2012

(65) Prior Publication Data
US 2013/0181152 A1     Jul. 18, 2013

(30) Foreign Application Priority Data
Oct. 15, 2010 (EP) .................... 10290559

(51) Int. Cl.
*F16K 11/16* (2006.01)
*F16K 31/52* (2006.01)
*F23N 1/00* (2006.01)
*F16K 31/524* (2006.01)
*F16K 11/22* (2006.01)
*F16K 27/02* (2006.01)
*F16K 31/44* (2006.01)

(52) U.S. Cl.
CPC .............. *F16K 11/165* (2013.01); *F16K 11/161* (2013.01); *F16K 11/22* (2013.01); *F16K 27/029* (2013.01); *F16K 27/0263* (2013.01); *F16K 31/445* (2013.01); *F16K 31/52416* (2013.01); *F23N 1/007* (2013.01); *F23N 2035/16* (2013.01); *F23N 2035/18* (2013.01); *F23N 2035/24* (2013.01)

(58) Field of Classification Search
CPC ..... F16K 11/165; F16K 11/22; F16K 11/161; F16K 31/52416; F23N 2035/18
USPC .................. 137/862, 624.18, 625.14, 625.15, 137/625.13, 630.16, 630.17, 625.42, 137/601.15, 627.5, 601.21, 636.3, 599.06, 137/601.05, 601.08, 601.09; 123/52, 39 N; 431/12, 280
See application file for complete search history.

(56) References Cited

U.S. PATENT DOCUMENTS 796,432 A * 8/1905 Junggren ........................ 415/150
2,226,856 A * 12/1940 Gunter ........................... 361/154
(Continued)

FOREIGN PATENT DOCUMENTS

| JP | S5312528 A | 2/1978 |
| JP | S58142457 U | 9/1983 |
| WO | 9911956 | 3/1999 |

OTHER PUBLICATIONS

International Search Report PCT/EP2011/067375 dated Jul. 11, 2013.

*Primary Examiner* — Atif Chaudry
(74) *Attorney, Agent, or Firm* — James E. Howard; Andre Pallapies

(57) ABSTRACT

A gas valve unit for setting a gas volumetric flow supplied to a gas burner of a gas appliance, in particular a gas cooking appliance includes a plurality of on/off valves which can be actuated mechanically by moving at least one body relative to the on/off valves. Each one of the on/off valves has an opening and a movable blocking body, which rests on a valve seat when the on/off valve is closed to thereby close off the opening.

32 Claims, 6 Drawing Sheets

(56) References Cited

U.S. PATENT DOCUMENTS

| | | | |
|---|---|---|---|
| 2,231,460 A * | 2/1941 | Barman | 137/597 |
| 3,014,489 A * | 12/1961 | Lamp, Jr. et al. | 137/1 |
| 4,170,245 A * | 10/1979 | Haley | 137/487.5 |
| 4,478,246 A * | 10/1984 | Sherrod | 137/557 |
| 5,213,091 A * | 5/1993 | Beach | 126/299 D |
| 5,938,425 A | 8/1999 | Damrath et al. | |
| 7,513,247 B2 | 4/2009 | Clauss et al. | |

* cited by examiner

GAS VALVE UNIT

BACKGROUND OF THE INVENTION

The invention relates to a gas valve unit for setting a gas volumetric flow supplied to a gas burner of a gas appliance, in particular a gas cooking appliance, wherein the gas valve unit has at least two on/off valves.

Gas valve units of the type mentioned above are described for example in the publications EP0818655A2 and WO2004063629A1. With such gas valve units it is possible to control the gas volumetric flow supplied to a gas burner of a gas cooking appliance in a number of stages. The gas volumetric flow has a reproducible size in each stage here. The throughflow cross section of the gas valve unit as a whole and therefore the size of the gas volumetric flow are set by opening or closing certain on/off valves of the gas valve unit, thereby releasing or interrupting the gas flow through certain throttle openings.

With the known generic gas valve units the on/off valves are actuated individually by electromagnetic means. To this end each of the on/off valves is assigned its own electromagnet, which opens or closes the on/off valve. The electromagnets are activated by an electronic control unit. This electronic control unit processes the signals generated by an operator of the gas cooking appliance by means of an electrical operating element and activates the electromagnets of the on/off valves accordingly.

BRIEF SUMMARY OF THE INVENTION

The object of the present invention is to provide a more simply embodied gas valve unit of the type mentioned above.

According to the invention this object is achieved in that the on/off valves can be actuated mechanically by moving at least one body relative to the on/off valves.

According to a first aspect of the invention a gas valve unit for setting a gas volumetric flow supplied to a gas burner of a gas appliance, in particular a gas cooking appliance, is proposed, wherein the gas valve unit has at least two on/off valves, wherein the at least two on/off valves can be actuated mechanically by moving at least one body relative to the on/off valves.

The gas valve unit is actuated by changing the position or the spatial orientation of the at least one body relative to the on/off valves to be actuated.

If the at least one body is moved manually by an operator, no electrical components are required to switch the on/off valves. Alternatively the at least one body can also be moved by any control element, for example an electric motor. The electric motor here is activated by an electric control unit. This allows the same gas valve unit to be actuated optionally either mechanically by the operator or by means of an electric control element. When cooking appliances are produced, gas valve units of identical structure can be combined with both mechanical user interfaces, for example rotary toggles, and with electrical user interfaces, for example touch sensors.

The gas valve unit is in particular part of a manually actuated multifunction control unit, which consists of a valve part and an adapted ignition protection device. Integrated in the valve part are in particular a grip or rotary toggle, valves, nozzles and seals. The grip can be pressed in by light pressure. This actuates the ignition protection device. The on/off valves are pressed onto seals by one or a number of resilient components in one or more gas-tight chambers, thereby preventing the throughflow to the associated openings or seal openings. The resilient components or springs find resistance in a cover that is positioned in a gas-tight manner.

In one preferred embodiment a plurality N of on/off valves is provided, each on/off valve having a movable blocking body, which rests on a valve seat when the on/off valve is closed, thereby closing off an opening in the valve seat.

Each on/off valve preferably has a closing spring, which presses the blocking body onto the valve seat when the on/off valve is closed. Each on/off valve also preferably has an opening spring acting counter to the closing spring. In particular the spring constant of the closing spring is greater than the spring constant of the opening spring.

In one preferred embodiment each on/off valve has an activation region, by way of which the on/off valve can be actuated by means of the at least one body.

The respective body is preferably configured as a carrier. The carrier is in particular embodied to raise the blocking body from the valve seat counter to the force of the closing spring by means of a force brought about by the carrier engaging in the activation region to open the on/off valve.

In one preferred embodiment the at least one body and the on/off valves are embodied in such a manner that either no on/off valve or just one on/off valve or just two on/off valves is/are opened as a function of the position of the body or as a function of the positions of the bodies. The size of the respective body and the possible positions of the body are designed for example so that the respective body can open a maximum of one on/off valve at one time. When the rotatable component is in the zero position, no body is disposed above an on/off valve.

The at least one body is preferably disposed above the on/off valves, which are disposed in a line, as a function of an angle of a rotatable component.

In one embodiment the at least two on/off valves can be actuated mechanically by moving two bodies relative to the on/off valves.

In particular a first body is disposed above the first on/off valve of the line of on/off valves when the rotatable component is at a first angle.

A second body preferably remains above the first on/off valve from a second angle, which is greater than the first angle, and the first body is moved above the on/off valves following the first on/off valve as a function of an increasing angle of the rotatable component.

In one preferred embodiment the second body is set up to interact with the first on/off valve to supply a base load of the gas volumetric flow. The first body is set up to interact with the further on/off valves to supply a respective supplementary load of the gas volumetric flow.

A plurality N of on/off valves—as stated above—is preferably provided, with each on/off valve having a movable blocking body, which rests on a valve seat when the on/off valve is closed, thereby closing off an opening or valve opening in the valve seat. In particular the openings have different diameters. The second to nth openings preferably have increasing diameters. This allows the connected supplementary load to be increased for each rotation angle.

As stated above, each on/off valve has a movable blocking body, which rests on a valve seat when the on/off valve is closed, thereby closing off an opening in the valve seat. When the on/off valve is open, gas flows through the opening in the valve seat. This gas flow is interrupted when the blocking body of the respective on/off valve rests on the valve seat.

The valve seat is preferably embodied as an essentially flat surface. The flat surface of the valve seat forms the sealing surface for the respective blocking body. No mechanical processing steps are therefore required to produce the valve seat per se, if a sheet-type material is used to produce the valve seat. Only the openings have then to be incorporated in the flat surface. Alternatively the valve seat can be configured as a molded seal, with the blocking body then being configured in a planar manner on its sealing surface. This variant has the advantage that the risk of damage to the sealing edge on the blocking body is reduced.

The valve seats of the at least two on/off valves are particularly advantageously formed by a common component. This common component can be embodied as a valve sealing plate and has an opening or valve opening for each on/off valve and a valve seat assigned to the opening. In particular each on/off valve has a closing spring, which presses the blocking body onto the valve seat when the on/off valve is closed. The closing spring therefore generates the closing force for the on/off valve. The closing spring therefore ensures that the on/off valve closes reliably, regardless of the incorporation position of the gas valve unit, for example even if the force of the weight of the blocking body counteracts the force of the closing spring.

Each blocking body is preferably formed by an essentially cylindrical plunger. The blocking body preferably has an annular sealing edge on its end facing the valve seat.

Each blocking body is guided in an axially movable manner in a valve body of the gas valve unit.

A particularly favorable arrangement is achieved when the blocking bodies of the individual on/off valves are disposed on a circular path around an axis of the gas valve unit and the blocking bodies can be moved parallel to said axis. This produces an annular arrangement, in which the openings of the valve sealing plate are also disposed on a circular path. The movement of the blocking bodies takes place perpendicular to the plane of the valve sealing plate.

To actuate the respective on/off valve, the position of the at least one body can be changed relative to the blocking body of the respective on/off valve. The activation region is then actuated by the respective body when the activation region is above the respective body. Otherwise the on/off valve is closed by means of the force of the closing spring acting on the blocking body.

According to a second aspect of the invention a gas valve unit for setting a gas volumetric flow supplied to a gas burner of a gas appliance, in particular a gas cooking appliance, is proposed, wherein the gas valve unit has at least two on/off valves, wherein the at least two on/off valves can be actuated mechanically by moving two bodies relative to the on/off valves.

In one preferred embodiment the two bodies and the on/off valves are embodied in such a manner that either no on/off valve or just one on/off valve or just two on/off valves is/are opened as a function of the positions of the two bodies. The size of the respective body and the possible positions of the body are designed so that the respective body can open a maximum of one on/off valve at one time. When the rotatable component is in the zero position, no body is disposed below an on/off valve.

When the rotatable component is rotated further, so that the resulting angle is greater than the first angle, when a second angle is reached the second body is disposed above the first on/off valve and remains above it even when the rotatable component is rotated further. In contrast the first body is moved above the on/off valves following the first on/off valve as a function of the increasing angle of the rotatable component. The second body can therefore interact with the first on/off valve to supply a base load of the gas volumetric flow. The first body can then interact with the further on/off valves to supply a respective supplementary load of the gas volumetric flow, as a function of the on/off valve above which the body is located.

This can be clarified using the following example with five on/off valves and the assumption that the (i+l)th angle is greater than the ith angle. When the rotatable component is at a first angle, the first body is above the first on/off valve. A base load is therefore supplied.

When the rotatable component is at a second angle, the first body is above the second on/off valve and the second body is above the first on/off valve. When the rotatable component is at a third angle, the first body is above the third on/off valve and the second body is above the first on/off valve. A base load is therefore supplied by means of the first on/off valve and a supplementary load by means of the third on/off valve.

When the rotatable component is at a fourth angle, the first body is above the fourth on/off valve and the second body is above the first on/off valve. Similarly when the rotatable component is at a fifth angle, the first body is above the fifth on/off valve and the second body is above the first on/off valve.

In a particularly expedient embodiment of the invention the two bodies are disposed on a component of the gas valve unit that can be rotated about the axis of the gas valve unit, with the axis preferably being formed by a switching shaft of the gas valve unit. When the rotatable component rotates, the bodies are moved on a circular path. However the second body, which follows after the first body, is only moved to the position above the first on/off valve in this process. The diameter of the circular path corresponds essentially to the diameter of the circular path, in which the blocking bodies are located. This means that when the rotatable component rotates, the first body can be moved above the blocking bodies of all the on/off valves.

In one particularly simple arrangement the rotatable component can be rotated manually about the axis by an operator. This means that no electrical or electronic components are required. Actuation of the gas valve unit takes place solely by means of the manual force of the operator, which can move the bodies relative to the activation regions of the on/off valves.

It is also possible for the rotatable component to be rotated about the axis by means of an electric control element. An electric motor, for example a servomotor, can be used in particular for the electric control element. The control element here is activated by an electric control unit, for example as a function of the signals from an electrical user interface or as a function of automated functions, for example automated power regulation or an automatic deactivator.

According to a third aspect of the invention a gas valve unit for setting a gas volumetric flow supplied to a gas burner of a gas appliance, in particular a gas cooking appliance, is proposed, wherein the gas valve unit has a number of on/off valves, wherein the number of on/off valves can be connected additively by means of mechanical actuation by at least one body that can be moved relative to the on/off valves.

The at least one body and the on/off valves are preferably embodied in such a manner that a specified number of on/off valves is opened as a function of the position of the at least one body.

In one preferred embodiment the at least one body is disposed above or below the on/off valves, which are disposed in a line, as a function of an angle of a rotatable component.

In particular a number of bodies corresponding to the number of on/off valves is provided, which is set up to connect the number of on/off valves additively.

Alternatively the at least one body can be embodied as a single carrier, which is set up to connect the number of on/off valves additively.

According to a fourth aspect of the invention a gas valve unit for setting gas volumetric flows to a twin-circuit gas burner of a gas appliance, in particular a gas cooking appliance, is proposed, wherein the gas valve unit has a gas input, two gas outputs and at least two on/off valves, wherein the gas volumetric flow supplied at a first gas output and the gas volumetric flow supplied at a second gas output can be set with multiple stages, wherein the at least two on/off valves can be actuated mechanically by moving at least one body relative to the on/off valves.

According to a fifth aspect of the invention a gas valve unit for setting gas volumetric flows to a twin-circuit gas burner of a gas appliance, in particular a gas cooking appliance, is proposed, wherein the gas valve unit has a gas input, two gas outputs and at least two on/off valves, wherein the gas volumetric flow to at least one of the gas outputs can be set with multiple stages, when the gas valve unit is in the zero position the gas volumetric flow to both gas outputs is interrupted and in a switching position adjacent to the zero position the gas volumetric flow, which can be set with multiple stages, is set to a maximum value, wherein the at least two on/off valves can be actuated mechanically by moving at least one body relative to the on/off valves.

BRIEF DESCRIPTION OF THE DRAWINGS

Further advantages and details of the invention are described in more detail below with reference to the exemplary embodiments illustrated in the schematic figures, in which.

DETAILED DESCRIPTION OF EXEMPLARY EMBODIMENTS OF THE PRESENT INVENTION

Figure 1:
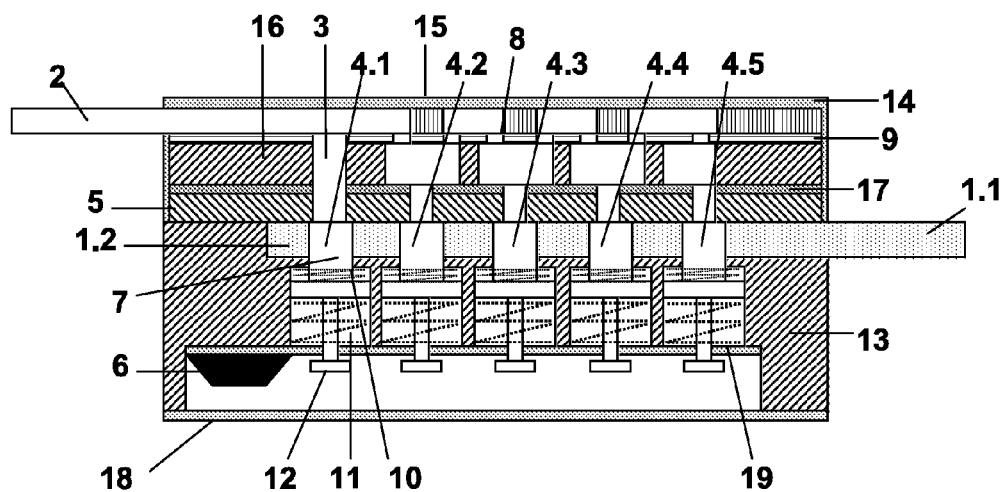
FIG. 1 shows a schematic switching arrangement of the gas valve unit with closed on/off valves.

FIGS. 1 to 5 show the switching arrangement of the inventive gas valve unit in successive switching states. They show a gas input 1, by means of which the gas valve unit is connected for example to a main gas line of a gas cooking appliance. At the gas input 1.1 the gas provided for combustion is at a constant pressure of for example 20 mbar or 50 mbar. Connected to a gas output 2 of the gas valve unit is a gas line, which leads for example to a gas burner of the gas cooking appliance. The gas input 1.1 is connected by way of a gas output chamber 3 of the gas valve unit to the input side of the in the present instance, five on/off valves 4 (4.1 to 4.5). The gas input 1.1 is connected to the gas output chamber 3 in each instance by opening the on/off valves 4. Disposed between a gas input chamber 1.2 and the gas output chamber 3 is a sealing plate or valve sealing plate 5.

The on/off valves 4 can be actuated mechanically by moving a carrier 6 relative to the on/off valves 4.

The carrier 6 and the on/off valves 4 here are embodied in such a manner that either no on/off valve 4 or just one on/off valve 4 or just two on/off valves 4 is/are opened as a function of the position of the carrier 6.

An opening 8 is assigned for this purpose in a nozzle plate 9 in the respective on/off valve 4.1 to 4.5. When the on/off valve 4.1 to 4.5 is opened, gas can pass from the gas input chamber 1.2 to the gas output chamber 3.

The valve seats of the on/off valves 4.1 to 4.5 are preferably formed by a common component. This common component is the valve sealing plate 5 for example.

Each on/off valve 4.1 to 4.5 has a closing spring 11, which presses a blocking body 7 onto the valve seat when the on/off valve 4.1 to 4.5 is closed. When the on/off valve 4 is closed, the movable blocking body 7 rests on the valve seat. The blocking body 7 is formed for example by an essentially cylindrical plunger. Each on/off valve 4.1 to 4.5 also has an opening spring 10, which acts counter to the closing spring 11.

Each on/off valve 4.1 to 4.5 also has an activation region 12, by way of which the on/off valve 4.1 to 4.5 can be actuated by means of the carrier 6.

The valve housing 13 of the gas valve unit consists essentially of a grip shaft 20 (see FIG. 6), a cover plate 14 and a composite seal/nozzle plate system. The composite seal/nozzle plate system is made up of an upper gas distribution seal 15, the nozzle plate 9, a lower gas distribution seal 16, a pressure plate 17 and the sealing plate 5.

The grip shaft 20 can be rotated and can be pressed in by light pressure. The composite seal/nozzle plate system rests on the side facing the grip shaft 20 and is integrated in a cover plate 14, the composite seal/nozzle plate system facing the opposite side of the grip shaft 20.

The grip shaft 20 is also guided with the aid of the cover plate 14. The cover plate 14 with the composite seal/nozzle plate system is preferably configured as a removable separator on the valve housing 13. The closing springs 11 find resistance at a pressure disk 19. Disposed opposite the closing springs 11 are opening springs 10. The opening springs 10 are braced against the valve housing 13 and counteract the closing springs 11 with a much smaller force.

Figure 6:
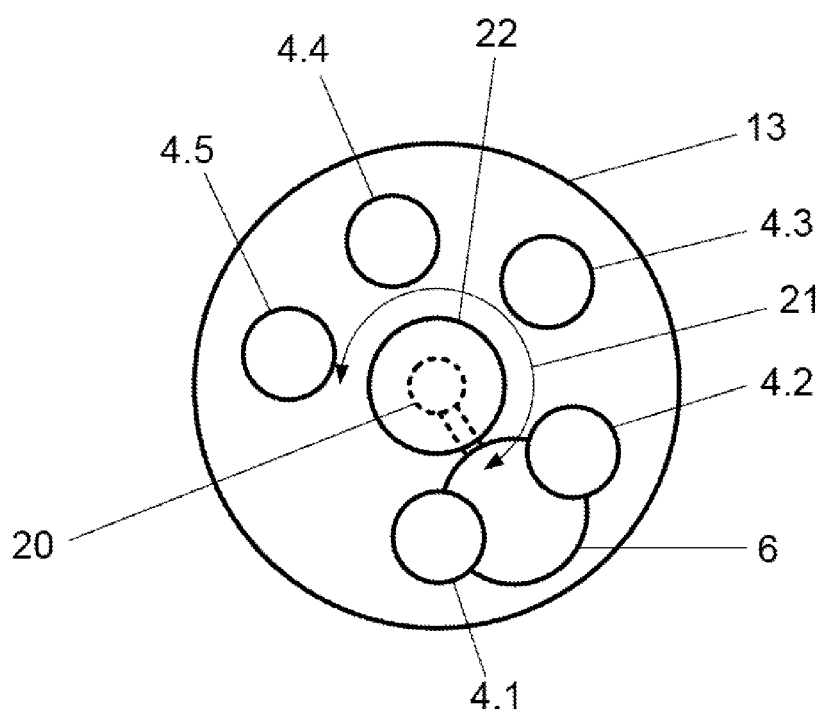
FIG. 6 shows a schematic gas valve in accordance with exemplary embodiments of the invention.

The blocking bodies or valve bodies 7 penetrate the pressure disk 19 with their activation regions 12. The grip shaft 20 displaces the carrier 6 on the pressure disk 19, so that the carrier 6 has contact with the activation region 12 of the respective on/off valve 4.1 to 4.5 and can open or close it. This side of the valve housing 13 is closed off by the gas-tight valve housing cover 18 and therefore lies on the opposite side of the grip shaft 20. The housing 13 is shown as a developing view in FIGS. 1 to 5. The grip shaft 20 is not shown in this representation, as it is disposed centrally, but is shown in FIG. 6. The visible grip shaft region is disposed above the cover plate 14.

The carrier 6 here is configured to raise the blocking body from the valve seat counter to the force of the closing spring 11 by means of a force brought about by the carrier 6 engaging in the activation region 12 to open the on/off valve 4.1 to 4.5. The blocking bodies 7 of the on/off valves 4.1 to 4.5 are preferably disposed on a circular path 21 (see FIG. 6) around an axis of the gas valve unit. The blocking bodies 7 can be moved parallel to this axis.

The position of the carrier 6 relative to the blocking bodies of the on/off valves 4.1 to 4.5 can be changed to actuate the on/off valves 4.1 to 4.5. In particular the carrier 6 is disposed below the on/off valves 4.1 to 4.5, which are disposed in a line, as a function of an angle of a rotatable component 22, such as a knob (see FIG. 6).

In the switching position according to FIG. 1 the carrier 6 is in the zero position and none of the on/off valves 4.1 to 4.5 is opened. Therefore no gas can flow from the gas input chamber 1.2 to the gas output chamber 3. All the on/off valves 4.1 to 4.5 form a seal on the valve sealing plate 5.

Figure 2:
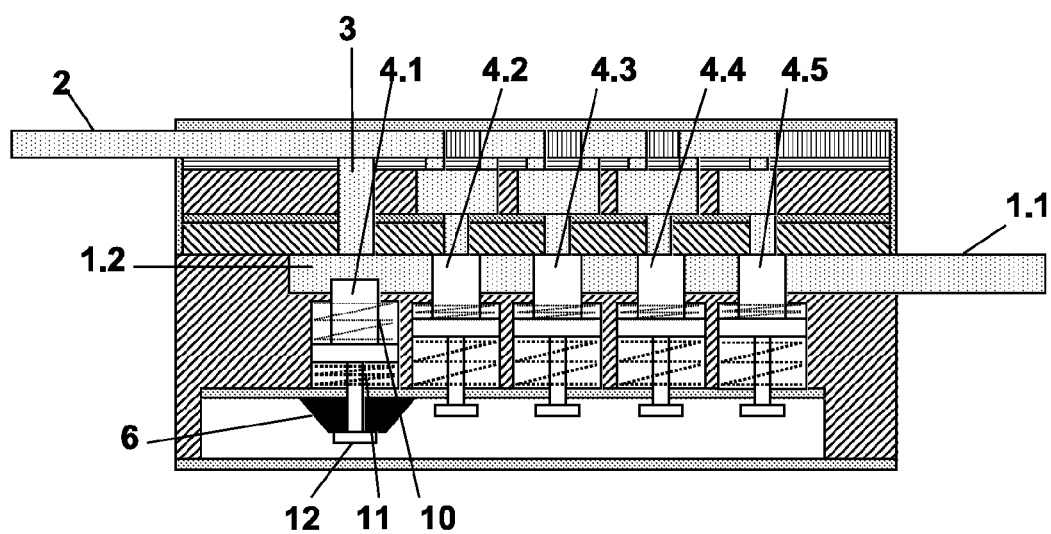
FIG. 2 shows a schematic switching arrangement of the gas valve unit with an opened first on/off valve.
Figure 3:
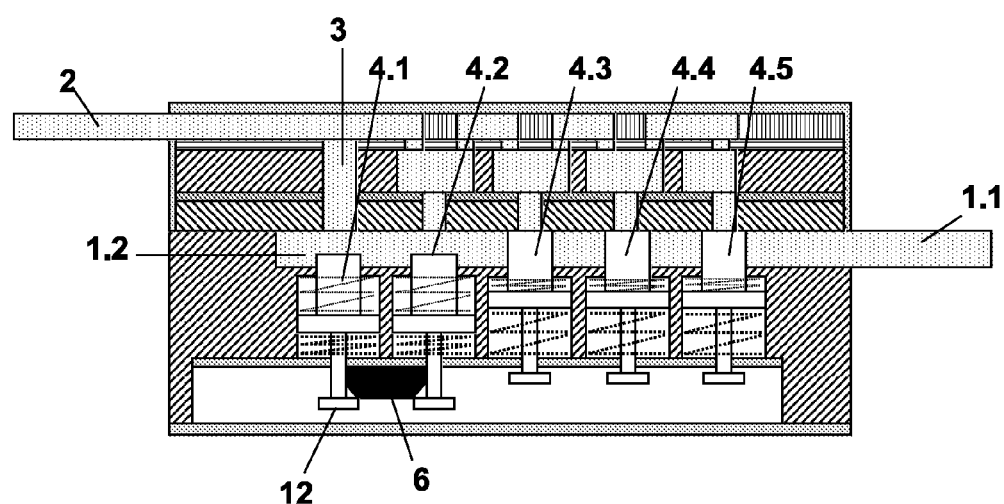
FIG. 3 shows a schematic switching arrangement of the gas valve unit with an opened first on/off valve and an opened second on/off valve.

When the carrier 6 is displaced from the zero position, it approaches the first on/off valve 4.1 and because of the contact with the activation region 12 of the first on/off valve 4.1 it causes the blocking body 7 of the first on/off valve 4.1 to be separated from the sealing plate 9. The gas path in the direction of the gas output chamber 3 and therefore in the direction of the gas output 2 is then open. This is shown in FIG. 2. In the example illustrated in FIGS. 1 to 5 the state of the open first on/off valve 4.1 corresponds to the full flame position, because this arrangement brings about the smallest pressure loss.

When the carrier 6 is displaced further, it approaches the second on/off valve 4.2 and because of the contact with the activation region of the second on/off valve 4.2 it also causes this to be separated from the sealing plate 9. Both on/off valves 4.1 and 4.2 are opened at this point (see FIG. 3). A change of throughflow preferably does not take place yet, because the pressure loss that occurs through the nozzle opening of the second on/off valve 4.2 is greater than in the first on/off valve 4.1.

Figure 4:
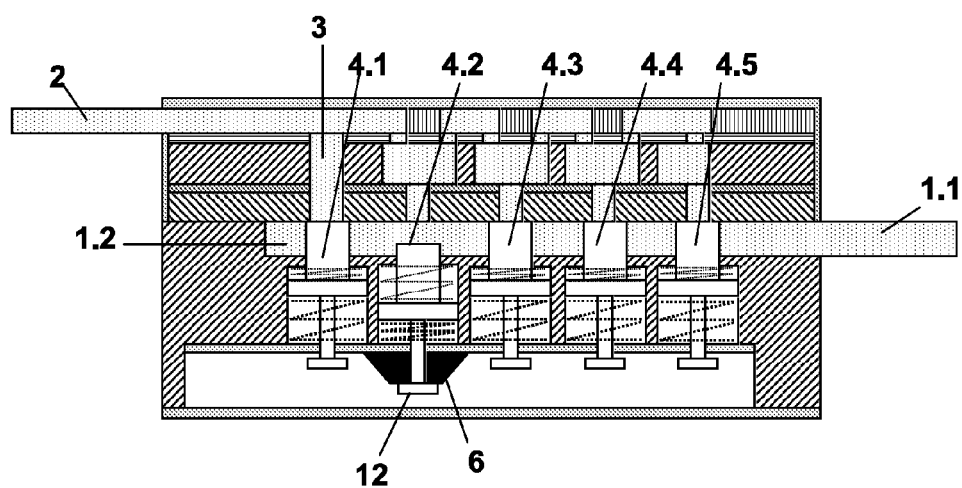
FIG. 4 shows a schematic switching arrangement of the gas valve unit with an opened second on/off valve.
Figure 5:
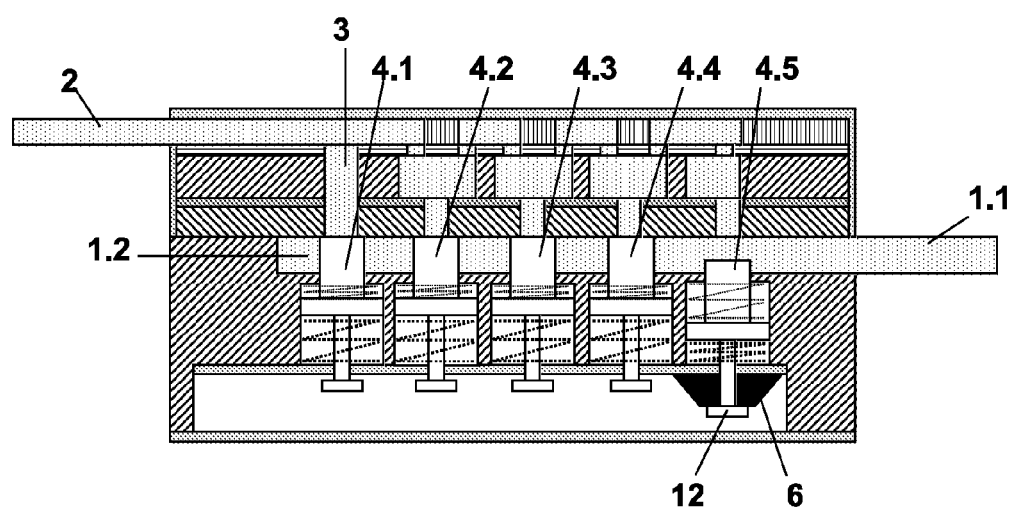
FIG. 5 shows a schematic switching arrangement of the gas valve unit with an opened fifth on/off valve.

When the carrier 6 is displaced further as in FIG. 4, the carrier 6 loses its contact with the activation region 12 of the first on/off valve 4.1. This means that the closing spring 11 closes the first on/off valve 4.1 again, so that the blocking body 7 of the first on/off valve 4.1 again forms a seal on the sealing plate 5. Only at this point does the reduced throughflow change by way of the second on/off valve 4.2 take place (see FIG. 4).

When the carrier 6 is displaced further to the fifth on/off valve 4.5 and only this is opened (see FIG. 5), the smallest possible throughflow quantity occurs in this position, because the following nozzle opening, which is released by the fifth on/off valve 4.5, preferably has the smallest throughflow cross section. The nozzle openings, through which the gas flow still flows in series in the direction of the gas output 2, preferably all have a greater nozzle cross section, so that no further throughflow quantity reduction can take place. Because all the on/off valves 4.1 to 4.5 are disposed parallel to one another and open or close with a time offset, the gas is forced to pass through all the openings 8 in the nozzle plate 9 in series up to the gas output 2. This arrangement means that the throughflow does not rise above or drop below a required level at the time of the respective switching operation of the on/off valves 4.1 to 4.5.

With the present gas valve unit the gas always flows first through the parallel on/off valve and then through the nozzle openings, which are connected in series.

The above switching states in FIGS. 1 to 5 are advantageously exactly reproducible. The switching states are exactly reproducible even for the smallest throughflow quantities at maximum connection pressure, without resulting in a rise above or a drop below the desired output stage.

No lubrication is required for the switching operations of the on/off valves, so there can be no displacement of the switching points.

The mechanically switching gas valve unit can be operated manually. An electronic system is not required but a motor drive can be used.

The inventive arrangement provides a rotational path of approximately 320°. The valve block can be configured as a ring or slide. The present gas valve unit can be used for any type of gas, even liquid gas.

There are also variants of the gas valve unit, in which varying quantities of gas can be achieved compared with a base load in the individual switching stages. A continuously increasing quantity of gas compared with the base load can also be achieved as a function of the embodiment of the opening cross sections. A zigzag profile is also even possible for the quantity of gas supplied.

In some embodiments of the gas valve unit the structure of the on/off valves can be configured in a very simple manner from the sealing plate when viewed in the flow direction, as there is no need for double perforation of the nozzle plate and further gas distribution plates.

LIST OF REFERENCE CHARACTERS

1.1 Gas input
1.2 Gas input chamber
2 Gas output
3 Gas output chamber
4 On/off valve
5 Valve sealing plate
6 Carrier
7 Blocking body
8 Opening
9 Nozzle plate
10 Opening spring
11 Closing spring
12 Activation region
13 Valve housing
14 Cover plate
15 Upper gas distribution seal
16 Lower gas distribution seal
17 Pressure plate
18 Cover
19 Pressure disk

The invention claimed is:

1. A gas valve unit for setting a gas volumetric flow supplied to a gas burner of a gas appliance, said gas valve unit comprising a plurality of on/off valves configured for actuation mechanically by moving at least one body relative to the on/off valves,
    wherein each one of the on/off valves has an opening and a movable blocking body, which rests on a valve seat when the on/off valve is closed to thereby close off the opening, and
    each one of the on/off valves has a closing spring which presses the blocking body onto the valve seat when the on/off valve is closed, and an opening spring which acts in opposition to the closing spring.

2. The gas valve unit of claim 1 for setting the gas volumetric flow supplied to a gas burner of a gas cooking appliance.

3. The gas valve unit of claim 1, wherein each one of the on/off valves has an activation region configured to enable actuation of the on/off valve by the at least one body.

4. The gas valve unit of claim 3, wherein said body being configured as a carrier configured to raise the blocking body from the valve seat in opposition to a force of the closing spring by applying a force upon the activation region to open the on/off valve.

5. The gas valve unit of claim 1, wherein the at least one body and the on/off valves are configured to open none of the on/off valves, or just one of the on/off valves, or just two of the on/off valves as a function of a position of the body.

6. The gas valve unit of claim 1, wherein the openings of the on/off valves have different diameters.

7. The gas valve unit of claim 1, wherein the on/off valves are disposed in a line to thereby define a first on/off valve and further on/off valve following the first on/off valve, wherein the openings of the further on/off valve have an opening cross section that increases along the line.

8. The gas valve unit of claim 1, further comprising a common component constructed to form the valve seats of the on/off valves.

9. The gas valve unit of claim 8, wherein the common component is a valve sealing plate.

10. The gas valve unit of claim 1, wherein the blocking bodies of the on/off valves are disposed on a circular path around an axis of the gas valve unit, said blocking bodies being moveable in parallel relationship to said axis.

11. The gas valve unit of claim 10, further comprising a switching shaft to define the axis.

12. The gas valve unit of claim 1, wherein the at least one body and the on/off valves are configured to
open none of the on/off valves in a first position of the at least one body,
open only one of the on/off valves in a second position of the at least one body, and
open two and only two of the on/off valves in a third position of the at least one body.

13. A gas valve unit for setting a gas volumetric flow supplied to a gas burner of a gas appliance, said gas valve unit comprising a plurality of on/off valves configured for actuation mechanically by moving at least one body relative to the on/off valves,
wherein the on/off valves are disposed in a line, said at least one body being disposed above the on/off valves as a function of an angle of a rotatable component,
said body comprising two of said body to define a first body and a second body, said first body being disposed above a first one of the on/off valves of the line when the rotatable component is at a first angle, and
the second body remains above the first one of the on/off valves starting from a second angle, which is greater than the first angle, and the first body is moved above the on/off valves following the first on/off valve as a function of an increasing angle of the rotatable component.

14. The gas valve unit of claim 13, wherein the second body is configured to interact with the first on/off valve to supply a base load of the gas volumetric flow, and the first body is configured to interact with the on/off valves following the first on/off valve to supply a supplementary load of the gas volumetric flow.

15. The gas valve unit of claim 13, wherein the first body, the second body and the on/off valves are configured to
open none of the on/off valves in a first position of the first body and the second body,
open only one of the on/off valves in a second position of the first body and the second body, and
open two and only two of the on/off valves in a third position of the first body and the second body.

16. A gas fitting, comprising at least one gas valve unit setting a gas volumetric flow supplied to a gas burner of a gas appliance, said gas valve unit comprising a plurality of on/off valves configured for actuation mechanically by moving at least one body relative to the on/off valves,
wherein each one of the on/off valves has an opening and a movable blocking body, which rests on a valve seat when the on/off valve is closed to thereby close off the opening, and
each one of the on/off valves has a closing spring which presses the blocking body onto the valve seat when the on/off valve is closed, and an opening spring which acts in opposition to the closing spring.

17. The gas fitting of claim 16, wherein each one of the on/off valves has an activation region configured to enable actuation of the on/off valve by the at least one body.

18. The gas fitting of claim 17, wherein said body being configured as a carrier configured to raise the blocking body from the valve seat in opposition to a force of the closing spring by applying a force upon the activation region to open the on/off valve.

19. The gas fitting of claim 16, wherein the at least one body and the on/off valves are configured to open none of the on/off valves, or just one of the on/off valves, or just two of the on/off valves as a function of a position of the body.

20. The gas fitting of claim 16, wherein the openings of the on/off valves have different diameters.

21. The gas fitting of claim 16, wherein the on/off valves are disposed in a line to thereby define a first on/off valve and further on/off valve following the first on/off valve, wherein the openings of the further on/off valve have an opening cross section that increases along the line.

22. The gas fitting of claim 16, wherein the gas valve unit has a common component constructed to form the valve seats of the on/off valves.

23. The gas fitting of claim 22, wherein the common component is a valve sealing plate.

24. The gas fitting of claim 16, wherein the blocking bodies of the on/off valves are disposed on a circular path around an axis of the gas fitting, said blocking bodies being moveable in parallel relationship to said axis.

25. The gas fitting of claim 24, wherein the gas valve unit has a switching shaft to define the axis.

26. A gas appliance, comprising the gas fitting of claim 16.

27. The gas appliance of claim 26, constructed in the form of a gas cooktop.

28. The gas appliance of claim 26, wherein the at least one body and the on/off valves are configured to
open none of the on/off valves in a first position of the at least one body,
open only one of the on/off valves in a second position of the at least one body, and
open two and only two of the on/off valves in a third position of the at least one body.

29. The gas fitting of claim 16, wherein the at least one body and the on/off valves are configured to
open none of the on/off valves in a first position of the at least one body,
open only one of the on/off valves in a second position of the at least one body, and
open two and only two of the on/off valves in a third position of the at least one body.

30. A gas fitting, comprising at least one gas valve unit setting a gas volumetric flow supplied to a gas burner of a gas appliance, said gas valve unit comprising a plurality of on/off valves configured for actuation mechanically by moving at least one body relative to the on/off valves,
wherein the on/off valves are disposed in a line, said at least one body being disposed above the on/off valves as a function of an angle of a rotatable component,
said body comprising two of said body to define a first body and a second body, said first body being disposed above a first one of the on/off valves of the line when the rotatable component is at a first angle, and the second body remains above the first one of the on/off valves starting from a second angle, which is greater than the first angle, and the first body is moved above the on/off valves following the first on/off valve as a function of an increasing angle of the rotatable component.

31. The gas fitting of claim 30, wherein the second body is configured to interact with the first on/off valve to supply a base load of the gas volumetric flow, and the first body is configured to interact with the on/off valves following the first on/off valve to supply a supplementary load of the gas volumetric flow.

32. The gas fitting of claim 30, wherein the first body, the second body and the on/off valves are configured to
  open none of the on/off valves in a first position of the first body and the second body,
  open only one of the on/off valves in a second position of the first body and the second body, and
  open two and only two of the on/off valves in a third position of the first body and the second body.

\* \* \* \* \*